(12) United States Patent
Jin et al.

(10) Patent No.: US 10,070,374 B2
(45) Date of Patent: Sep. 4, 2018

(54) METHOD, NODE, MOBILE TERMINAL, AND SYSTEM FOR IDENTIFYING NETWORK TETHERING BEHAVIOR

(71) Applicant: Huawei Technologies Co., Ltd., Shenzhen, Guangdong (CN)

(72) Inventors: Tao Jin, Beijing (CN); Guobao Xi, Shanghai (CN); Liang He, Guatemala (GT)

(73) Assignee: Huawei Technologies Co., Ltd., Shenzhen (CN)

(*) Notice: Subject to any disclaimer, the term of this patent is extended or adjusted under 35 U.S.C. 154(b) by 536 days.

(21) Appl. No.: 14/574,029

(22) Filed: Dec. 17, 2014

(65) Prior Publication Data

US 2015/0103697 A1 Apr. 16, 2015

Related U.S. Application Data

(63) Continuation of application No. PCT/CN2012/077227, filed on Jun. 20, 2012.

(51) Int. Cl.
*H04W 12/08* (2009.01)
*H04W 48/16* (2009.01)
(Continued)

(52) U.S. Cl.
CPC ......... *H04W 48/16* (2013.01); *H04L 41/0893* (2013.01); *H04L 61/6054* (2013.01);
(Continued)

(58) Field of Classification Search
CPC ....... H04W 48/16; H04W 4/80; H04W 8/005; H04W 48/00; H04W 88/16; H04L 61/6054; H04L 41/0893; H04L 69/16; H04L 69/22
See application file for complete search history.

(56) References Cited

U.S. PATENT DOCUMENTS 6,625,156 B2 * 9/2003 Shaio .................. H04L 12/5695
370/351
6,775,291 B1 8/2004 Ryu et al.
(Continued)

FOREIGN PATENT DOCUMENTS

CN 1866951 A 11/2006
CN 101145909 A 3/2008
(Continued)

OTHER PUBLICATIONS

Wang Longshun, et al., "TCP session by identifying a network share", Jun. 2010, 5 pages.
(Continued)

*Primary Examiner* — Phuc Tran (57) ABSTRACT

Embodiments of the present invention relate to the field of communications, and provide a method, a node, a mobile terminal and a system for identifying a network tethering behavior. The method includes: receiving, by a gateway general packet radio service support node (GGSN), an Internet protocol (IP) packet sent by a to-be-networked device and forwarded by a mobile terminal; acquiring a time to live (TTL) value in the IP packet; determining whether the acquired TTL value is different from a specified TTL value; and if yes, determining that the to-be-networked device performs a network tethering behavior. Further provided are a corresponding gateway general packet radio service support node, mobile terminal and system. The present invention improves accuracy of identifying a network tethering behavior and expands a range of applicable scenarios for identifying a network tethering behavior.

14 Claims, 7 Drawing Sheets

(51) Int. Cl.
*H04W 4/80* (2018.01)
*H04W 48/00* (2009.01)
*H04L 29/06* (2006.01)
*H04L 12/24* (2006.01)
*H04L 29/12* (2006.01)
*H04W 8/00* (2009.01)
*H04W 88/16* (2009.01)

(52) U.S. Cl.
CPC .............. *H04L 69/16* (2013.01); *H04L 69/22* (2013.01); *H04W 4/80* (2018.02); *H04W 8/005* (2013.01); *H04W 48/00* (2013.01); *H04W 88/16* (2013.01)

(56) References Cited

U.S. PATENT DOCUMENTS

| | | | | |
|---|---|---|---|---|
| 7,367,054 | B2 * | 4/2008 | Soppera | H04L 63/0823 713/153 |
| 8,023,432 | B2 * | 9/2011 | Herzog | H04W 76/045 370/254 |
| 8,074,279 | B1 * | 12/2011 | Lin | H04W 12/08 709/243 |
| 8,862,726 | B1 * | 10/2014 | Song | H04L 67/22 709/224 |
| 8,943,554 | B2 * | 1/2015 | Tran | H04L 63/1416 726/1 |
| 8,971,849 | B2 * | 3/2015 | Bhatia | H04W 12/08 370/229 |
| 9,503,585 | B2 * | 11/2016 | Baldwin | H04M 15/00 |
| 2004/0213228 | A1 | 10/2004 | Tingle et al. | |
| 2009/0279543 | A1 * | 11/2009 | Strom | H04W 76/027 370/389 |
| 2011/0086610 | A1 | 4/2011 | Baldwin et al. | |
| 2011/0116377 | A1 | 5/2011 | Batz et al. | |
| 2015/0222489 | A1 * | 8/2015 | Perez Martinez | H04W 24/02 370/328 |

FOREIGN PATENT DOCUMENTS

| | | |
|---|---|---|
| CN | 101286894 A | 10/2008 |
| CN | 102075386 A | 5/2011 |
| CN | 102457938 A | 5/2012 |
| EP | 1 366 590 B1 | 5/2005 |
| KR | 20110002083 A | 1/2011 |
| KR | 20120043919 A | 5/2012 |
| RU | 2321959 C2 | 4/2008 |
| WO | WO 01/20846 A2 | 3/2001 |
| WO | WO 2011/045733 A1 | 4/2011 |
| WO | WO 2012/031623 A1 | 3/2012 |

OTHER PUBLICATIONS

"How does WiFi-Tethering work and how do carriers detect it?", xdadevelopers, Jul. 24, 2010, 3 pages.
"How Network Providers Can Tell You're Tethering", 2015, 1 page.
"TTL modification to cloak tethered packets-let's make them work harder to catch", MacRumors, Apr. 21, 2011, 9 pages.
Zhao Bingxiu, "The Principle and Implementation of the ADSL Internet Sharing Detection", Apr. 2009, 4 pages.

* cited by examiner

METHOD, NODE, MOBILE TERMINAL, AND SYSTEM FOR IDENTIFYING NETWORK TETHERING BEHAVIOR

CROSS-REFERENCE TO RELATED APPLICATIONS

This application is a continuation of International Application No. PCT/CN2012/077227, filed on Jun. 20, 2012, which is hereby incorporated by reference in its entirety.

TECHNICAL FIELD

The present invention relates to the field of communications, and in particular, to a method, a node, a mobile terminal and a system for identifying a network tethering behavior.

BACKGROUND

A network tethering (Tethering) behavior refers to a behavior that a to-be-networked device is connected to a mobile terminal by means of WiFi (Wireless Fidelity, wireless fidelity), Bluetooth, a USB (Universal Serial BUS, universal serial bus), or the like to implement mobile network tethering through the mobile terminal. The to-be-networked device includes, but is not limited to, a computer, a tablet computer, and a mobile terminal. A manner in which the computer, tablet computer or the like interacts with the mobile network is different from a manner in which the mobile terminal interacts with the mobile network. For example, for the manner in which the computer, tablet computer or the like interacts with the mobile network, more P2P (Point to Point, point to point) downloading operations may be performed, which causes a great impact on the mobile network, aggravates congestion of the mobile network, and impacts the sale of services such as a data card, thereby affecting the revenues of operators. Therefore, many operators hope to be able to identify and control the network tethering behavior.

In the prior art, there are two methods for identifying a network tethering behavior. In solution 1, when an IP (Internet Protocol, Internet protocol) packet is a Get request packet, a GGSN (Gateway General Packet Radio Service Support Node, gateway general packet radio service support node) performs DPI (Deep Packet Inspection, deep packet inspection) parsing on the received Get packet, to determine a UA (User-Agent, user-agent) field in the Get packet. The UA is a special string header included in the Get packet, and stores information such as an operating system and a version thereof, a browser and a version thereof, a browser rendering engine, a browser language, and a browser plug-in used by an IP packet sending device. The GGSN can determine a network access type of the IP packet sending device according to information such as the operating system in the UA, so as to distinguish whether the IP packet sending device accesses a network through a network tethering behavior. In solution 2, a separate APN (Access Point Name, access point name) is set for a to-be-networked device for a network tethering function and is independent of an APN of a mobile terminal, and then the GGSN can identify a network tethering behavior by identifying the APN.

In solution 1, if the mobile terminal performs a service without a Get packet, the GGSN cannot acquire a UA field in a Get packet, and cannot further identify a network tethering behavior; if the mobile terminal performs a service with a Get packet, because browsers of a large part of mobile terminals can set UAs by themselves and users can also modify UAs, it is easy for the GGSN to identify a network tethering behavior wrongly. In solution 2, currently, only an iOS (iPhone Operating System, iPhone operating system) supports setting of a separate APN for the network tethering function, and an operator can configure an APN for the network tethering function in the mobile terminal only when cooperating with Apple Inc., thereby having a narrow applicable scenario.

SUMMARY

Embodiments of the present invention provide a method, a node, a mobile terminal, and a system for identifying a network tethering behavior, so as to improve accuracy of identifying a network tethering behavior and expand a range of applicable scenarios for identifying a network tethering behavior. The technical solutions are as follows.

In an aspect, a method for identifying a network tethering behavior is provided, where the method includes:

receiving, by a gateway general packet radio service support node GGSN, an Internet protocol IP packet sent by a to-be-networked device and forwarded by a mobile terminal;

acquiring a time to live TTL value in the IP packet;

determining whether the acquired TTL value is different from a specified TTL value; and if yes, determining that the to-be-networked device performs a network tethering behavior.

Specifically, the determining whether the acquired TTL value is different from a specified TTL value includes: determining, by the GGSN, whether the TTL value in the IP packet is 1 less than the specified TTL value.

Further, before the receiving, by a gateway general packet radio service support node GGSN, an Internet protocol IP packet sent by a to-be-networked device and forwarded by a mobile terminal, the method further includes:

receiving, by the GGSN, a packet data protocol PDP activation request which is sent by the mobile terminal and includes at least international mobile subscriber identity IMSI information;

sending the IMSI information to a policy and charging rules function PCRF;

receiving a policy and a rule which are delivered by the PCRF according to subscription information of subscriber corresponding to the IMSI information; and sending an activation success notification message to the mobile terminal.

Further, before the receiving a policy and a rule which are delivered by the PCRF according to subscription information of subscriber corresponding to the IMSI information, the method further includes:

determining, by the PCRF and according to the IMSI information, whether a subscriber subscribes a network tethering service;

if yes, delivering a policy and a rule for subscription to the network tethering service to the GGSN; and if not, delivering a policy and a rule for no subscription to the network tethering service to the GGSN.

Further, after the determining that the to-be-networked device performs a network tethering behavior, the method further includes:

if the GGSN already receives a notification message delivered by the PCRF, and the notification message carries an event trigger parameter for instructing the GGSN to report the network tethering behavior, reporting the network tethering behavior to the PCRF, so that the PCRF notifies the mobile terminal that the to-be-networked device is using a network tethering service.

Further, the reporting the network tethering behavior to the PCRF includes:
sending, by the GGSN, a status parameter added on a Gx interface to the PCRF, where the status parameter is used to mark a status of the network tethering behavior.

Further, after the determining that the to-be-networked device performs a network tethering behavior, the method further includes:
processing, by the GGSN, the IP packet according to a preset policy and rule; or
processing, by the GGSN, the IP packet according to a policy and a rule delivered by the PCRF.

In another aspect, a method for identifying a network tethering behavior is further provided, where the method includes:
receiving, by a mobile terminal, an Internet protocol IP packet sent by a to-be-networked device;
modifying a time to live TTL value in the IP packet; and
forwarding the IP packet including the modified TTL value to a gateway general packet radio service support node GGSN, so that the GGSN identifies a network tethering behavior of the to-be-networked device according to the modified TTL value.

Specifically, the modifying a time to live TTL value in the IP packet includes:
subtracting, by the mobile terminal, 1 from the TTL value in the IP packet.

Further, before the receiving, by a mobile terminal, an Internet protocol IP packet sent by a to-be-networked device, the method further includes:
sending, by the mobile terminal, a packet data protocol PDP activation request including at least international mobile subscriber identity IMSI information to the GGSN, so that the GGSN sends the IMSI information to a policy and charging rules function PCRF; and
after the GGSN receives a policy and a rule which are delivered by the PCRF according to subscription information of subscriber corresponding to the IMSI information, receiving an activation success notification message sent by the GGSN.

In still another aspect, a gateway general packet radio service support node GGSN is further provided, where the GGSN includes:
a first receiving module, configured to receive an Internet protocol IP packet sent by a to-be-networked device and forwarded by a mobile terminal;
an acquiring module, configured to acquire a time to live TTL value in the IP packet;
a determining module, configured to determine whether the acquired TTL value is different from a specified TTL value; and
an identifying module, configured to, if the determining module determines that the acquired TTL value is different from the specified TTL value, determine that the to-be-networked device performs a network tethering behavior.

The determining module is configured to determine whether the TTL value in the IP packet is 1 less than the specified TTL value.

The GGSN further includes:
a second receiving module, configured to receive a packet data protocol PDP activation request which is sent by the mobile terminal and includes at least international mobile subscriber identity IMSI information;

a first sending module, configured to send the IMSI information to a policy and charging rules function PCRF;
a third receiving module, configured to receive a policy and a rule which are delivered by the PCRF according to subscription information of subscriber corresponding to the IMSI information; and
a second sending module, configured to send an activation success notification message to the mobile terminal.

The GGSN further includes:
a reporting module, configured to, if the GGSN already receives a notification message delivered by the PCRF, and the notification message carries an event trigger parameter for instructing the GGSN to report the network tethering behavior, report the network tethering behavior to the PCRF, so that the PCRF notifies the mobile terminal that the to-be-networked device is using a network tethering service.

The reporting module is configured to send a status parameter added on a Gx interface to the PCRF, where the status parameter is used to mark a status of the network tethering behavior.

The GGSN further includes:
a first processing module, configured to process the IP packet according to a preset policy and rule; or
a second processing module, configured to process the IP packet according to a policy and a rule delivered by the PCRF.

In yet another aspect, a mobile terminal is further provided, where the mobile terminal includes:
a fourth receiving module, configured to receive an Internet protocol IP packet sent by a to-be-networked device;
a modifying module, configured to modify a time to live TTL value in the IP packet; and
a forwarding module, configured to forward the IP packet including the modified TTL value to a gateway general packet radio service support node GGSN, so that the GGSN identifies a network tethering behavior of the to-be-networked device according to the modified TTL value.

The modifying module is configured to subtract 1 from the TTL value in the IP packet.

The mobile terminal further includes:
a third sending module, configured to send a packet data protocol PDP activation request including at least international mobile subscriber identity IMSI information to the GGSN, so that the GGSN sends the IMSI information to a policy and charging rules function PCRF; and
a fifth receiving module, configured to, after the GGSN receives a policy and a rule which are delivered by the PCRF according to subscription information of subscriber corresponding to the IMSI information, receive an activation success notification message sent by the GGSN.

In yet another aspect, a system for identifying a network tethering behavior is further provided, where the system includes the gateway general packet radio service support node GGSN described in the foregoing and the mobile terminal described in the foregoing.

The technical solutions provided in the embodiments of the present invention have the following beneficial effects:
An IP packet sent by a to-be-networked device and forwarded by a mobile terminal is received, a TTL value in the IP packet is acquired, and if it is determined that the acquired TTL value is different from a specified TTL value, it is determined that the mobile terminal modifies the TTL value and it is further determined that the IP packet is forwarded by the mobile terminal, thereby determining that the to-be-networked device performs a network tethering behavior. A TTL value exists in each IP packet, so a method for identifying a network tethering behavior according to the modified TTL value avoids a problem in the prior art that a network tethering behavior cannot be determined when no UA field exists in a Get packet, and improves accuracy of identifying a network tethering behavior. Moreover, an operating system corresponds to a fixed TTL value, so the method for identifying a network tethering behavior according to the modified TTL value is applicable to any operating system, thereby expanding a range of applicable scenarios for identifying a network tethering behavior.

BRIEF DESCRIPTION OF THE DRAWINGS

To describe the technical solutions according to the embodiments of the present invention more clearly, the following briefly describes accompanying drawings required for describing the embodiments. Apparently, the accompanying drawings in the following description show merely some embodiments of the present invention, and persons of ordinary skill in the art may still derive other drawings according to these accompanying drawings without creative efforts.

DETAILED DESCRIPTION

To make the objectives, technical solutions and advantages of the present invention more comprehensible, the following further describes the embodiments of the present invention in detail with reference to the accompanying drawings.

This embodiment relates to a behavior of a to-be-networked device accessing a network through a mobile network of a mobile terminal. The mobile network may include, but is not limited to, a GPRS (General Packet Radio Service, general packet radio service) network, a 3G (3rd-generation, 3rd generation mobile communication technology) network, a WiFi network, and a WiMax (Worldwide Interoperability for Microwave Access, worldwide interoperability for microwave access) network. The GPRS network is used as an example for description in the embodiments of the present invention, which is not specially stated hereinafter.

Embodiment 1

Figure 1:
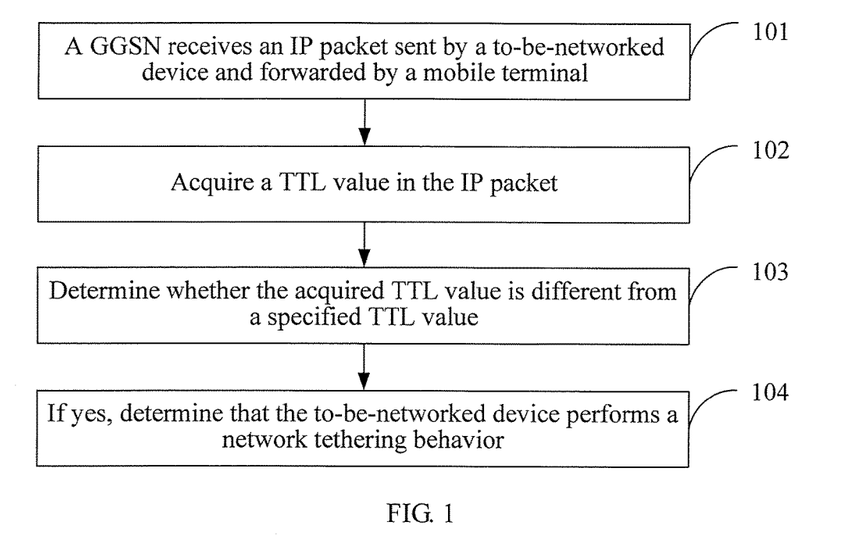
FIG. 1 is a flow chart of a method for identifying a network tethering behavior according to Embodiment 1 of the present invention.

Referring to FIG. 1, this embodiment provides a method for identifying a network tethering behavior. The flow of the method is specifically as follows:

101: A GGSN receives an IP packet sent by a to-be-networked device and forwarded by a mobile terminal.

The GGSN is a gateway GPRS support node, has a network-controlled information shielding function, and is capable of selecting an IP packet that can enter a GPRS network, so as to ensure security of the GPRS network.

The to-be-networked device refers to a device performing a network access behavior through a GPRS network of a mobile terminal, and may include, but is not limited to, a computer, a tablet computer, and a mobile terminal.

The IP packet is a data unit exchanged and transmitted in the Internet protocol.

102: Acquire a TTL (Time to Live, time to live) value in the IP packet.

The TTL is a flag bit in a header of the IP packet and is used to indicate the number of network segments through which the IP packet is allowed to pass before the IP packet is discarded. The TTL value is generally related to an operating system, and a TTL value in an uplink IP packet of the to-be-networked device is generally fixed.

103: Determine whether the acquired TTL value is different from a specified TTL value.

104: If yes, determine that the to-be-networked device performs a network tethering behavior.

The network tethering behavior refers to a behavior that the to-be-networked device is connected to the mobile terminal by means of WiFi, Bluetooth, a USB, or the like to implement mobile network tethering through the mobile terminal.

Specifically, the determining whether the acquired TTL value is different from a specified TTL value may include: determining, by the GGSN, whether the TTL value in the IP packet is 1 less than the specified TTL value.

Further, before the GGSN receives the IP packet sent by the to-be-networked device and forwarded by the mobile terminal, the method may further include:

receiving, by the GGSN, a PDP (Packet Data Protocol, packet data protocol) activation request which is sent by the mobile terminal and includes at least IMSI (International Mobile Subscriber Identification Number, international mobile subscriber identity) information;

sending the IMSI information to a PCRF (Policy and Charging Rules Function, policy and charging rules function);

receiving a policy and a rule which are delivered by the PCRF according to subscription information of subscriber corresponding to the IMSI information; and sending an activation success notification message to the mobile terminal.

Further, before the receiving a policy and a rule which are delivered by the PCRF according to subscription information of subscriber corresponding to the IMSI information, the method may further include:

determining, by the PCRF, according to the IMSI information, whether a subscriber subscribes a network tethering service;

if yes, delivering a policy and a rule for subscription to the network tethering service to the GGSN; and if not, delivering a policy and a rule for no subscription to the network tethering service to the GGSN.

Further, after the determining that the to-be-networked device performs a network tethering behavior, the method may further include:

if the GGSN already receives a notification message delivered by the PCRF, and the notification message carries an event trigger parameter for instructing the GGSN to report the network tethering behavior, reporting the network tethering behavior to the PCRF, so that the PCRF notifies the mobile terminal that the to-be-networked device is using the network tethering service.

Further, the reporting the network tethering behavior to the PCRF may include:

sending, by the GGSN, a status parameter added on a Gx interface to the PCRF, where the status parameter is used to mark a status of the network tethering behavior.

Further, after the determining that the to-be-networked device performs a network tethering behavior, the method may further include:

processing, by the GGSN, the IP packet according to a preset policy and rule; or processing, by the GGSN, the IP packet according to the policy and the rule delivered by the PCRF.

In the foregoing method provided in this embodiment, an IP packet sent by a to-be-networked device and forwarded by a mobile terminal is received, a TTL value in the IP packet is acquired, and if it is determined that the acquired TTL value is different from a specified TTL value, it is determined that the mobile terminal modifies the TTL value and it is further determined that the IP packet is forwarded by the mobile terminal, thereby determining that the to-be-networked device performs a network tethering behavior. A TTL value exists in each IP packet, so a method for identifying a network tethering behavior according to the modified TTL value avoids a problem in the prior art that a network tethering behavior cannot be determined when no UA field exists in a Get packet, and improves accuracy of identifying a network tethering behavior. Moreover, an operating system corresponds to a fixed TTL value, so the method for identifying a network tethering behavior according to the modified TTL value is applicable to any operating system, thereby expanding a range of applicable scenarios for identifying a network tethering behavior.

Moreover, if it is determined that a notification message delivered by the PCRF is received, and the notification message carries an event trigger parameter for instructing the GGSN to report the network tethering behavior, the network tethering behavior is reported to the PCRF, so that the PCRF can notify the mobile terminal that the to-be-networked device is using a network tethering service, and a subscriber of the mobile terminal can control the network tethering behavior, thereby reducing the use of the network tethering service caused by misoperation, and making the identification of the network tethering behavior more humanized.

Embodiment 2

Figure 2:
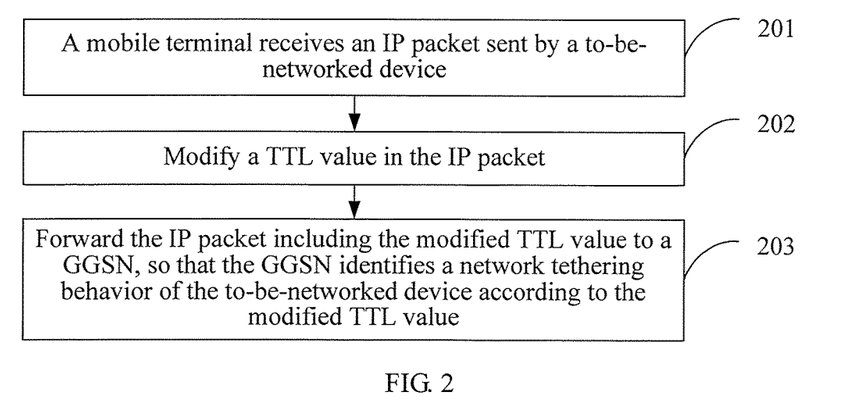
FIG. 2 is a flow chart of a method for identifying a network tethering behavior according to Embodiment 2 of the present invention.

Referring to FIG. 2, this embodiment provides a method for identifying a network tethering behavior. The flow of the method is specifically as follows:

201: A mobile terminal receives an IP packet sent by a to-be-networked device.

202: Modify a TTL value in the IP packet.

After receiving the IP packet sent by the to-be-networked device, the mobile terminal acquires the TTL value in the IP packet and modifies the acquired TTL value to indicate that the IP packet is sent by the to-be-networked device, so as to distinguish the IP packet from an IP packet sent by the mobile terminal to a GPRS network.

203: Forward the IP packet including the modified TTL value to the GGSN, so that the GGSN identifies a network tethering behavior of the to-be-networked device according to the modified TTL value.

Specifically, the modifying a TTL value in the IP packet may include:

subtracting, by the mobile terminal, 1 from the TTL value in the IP packet.

Further, before the mobile terminal receives the IP packet sent by the to-be-networked device, the method may further include:

sending, by the mobile terminal, a PDP activation request including at least IMSI information to the GGSN, so that the GGSN sends the IMSI information to a PCRF; and after the GGSN receives a policy and a rule which are delivered by the PCRF according to subscription information corresponding to the IMSI information, receiving an activation success notification message sent by the GGSN.

In the foregoing method provided in this embodiment, an IP packet sent by a to-be-networked device is received, a TTL value in the IP packet is modified, and the IP packet including the modified TTL value is forwarded to the GGSN, so that the GGSN can determine, according to the modified TTL value, that the IP packet is forwarded by the mobile terminal, thereby identifying a network tethering behavior of the to-be-networked device. A TTL value exists in each IP packet, so a method for identifying a network tethering behavior according to the modified TTL value avoids a problem in the prior art that a network tethering behavior cannot be determined when no UA field exists in a Get packet, and improves accuracy of identifying a network tethering behavior. Moreover, an operating system corresponds to a fixed TTL value, so the method for identifying a network tethering behavior according to the modified TTL value is applicable to any operating system, thereby expanding a range of applicable scenarios for identifying a network tethering behavior.

Embodiment 3

Figure 3:
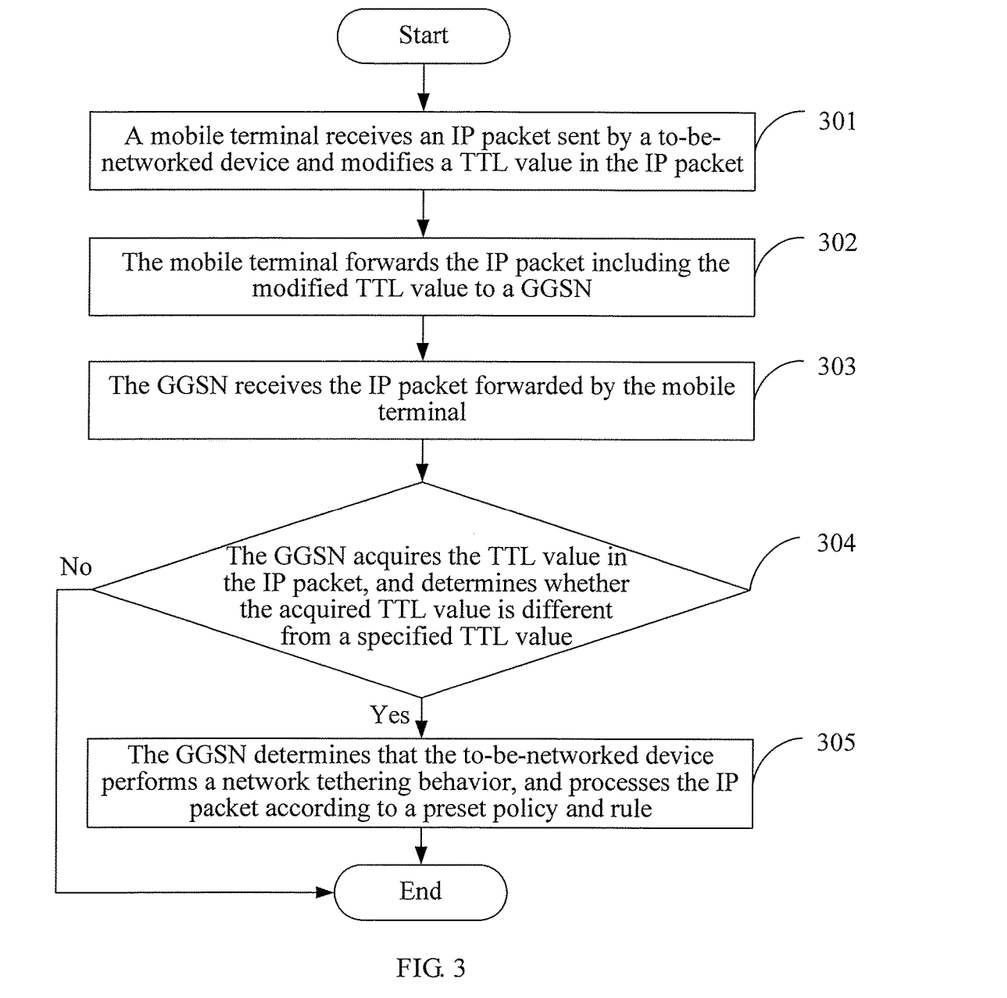
FIG. 3 is a flow chart of a method for identifying a network tethering behavior according to Embodiment 3 of the present invention.

Referring to FIG. 3, this embodiment provides a method for identifying a network tethering behavior, where an IP packet is processed according to a policy and a rule preset by a GGSN. The flow of the method is specifically as follows:

301: A mobile terminal receives an IP packet sent by a to-be-networked device and modifies a TTL value in the IP packet.

In this embodiment, the to-be-networked device refers to a device performing a network access behavior through a GPRS network of a mobile terminal, and may include, but is not limited to, a computer, a tablet computer, and a mobile terminal. Specifically, the to-be-networked device may be connected to the mobile terminal by means of WiFi, Bluetooth, a USB, or the like, and send the IP packet to the mobile terminal, and the mobile terminal forwards the IP packet to the GPRS network, thereby implementing a network access behavior through the GPRS network of the mobile terminal. The IP packet is a data unit exchanged and transmitted in the Internet protocol.

A TTL is a flag bit in a header of the IP packet and is used to indicate the number of network segments through which the IP packet is allowed to pass before the IP packet is discarded. A TTL value is generally related to an operating system, and the TTL value in an uplink IP packet of a to-be-networked device is generally fixed. TTL values of common operating systems are listed in Table 1. For example, a TTL value of Linux is 64, a TTL value of Apple iOS (Apple operating system) is 64, and a TTL value of Windows Phone is 128.

TABLE 1

| Operating System | TTL Value | TTL Value After Network Tethering |
|---|---|---|
| Windows XP/Vista/7 | 128 | 127 |
| Linux | 64 | 63 |
| Apple Mac OS X | 64 | 63 |
| Apple iOS | 64 | 63 |
| Android | 64 | 63 |
| Windows Phone | 128 | 127 |
| Blackberry | 128 | 127 |
| Symbian | 69 | 68 |

In this embodiment, after receiving the IP packet sent by the to-be-networked device, the mobile terminal acquires the TTL value in the IP packet and modifies the acquired TTL value to indicate that the IP packet is sent by the to-be-networked device, so as to distinguish the IP packet sent by the to-be-networked device from an IP packet sent by the mobile terminal to the GPRS network.

Further, the modifying a TTL value in the IP packet may specifically be: subtracting, by the mobile terminal, 1 from the TTL value in the IP packet. For example, a Windows Phone is connected to an Apple iOS and implements a network tethering behavior through the Apple iOS; and after receiving an IP packet sent by the Windows Phone, the Apple iOS acquires the TTL value in the IP packet which is 128, subtracts 1 from 128 to obtain 127, and replaces the original TTL value 128 with 127.

302: The mobile terminal forwards the IP packet including the modified TTL value to a GGSN.

In this embodiment, the GGSN is a gateway GPRS support node, has a network-controlled information shielding function, and is capable of selecting an IP packet that can enter a GPRS network, so as to ensure security of the GPRS network. Moreover, the GGSN in this embodiment further has a charging information collection function and is capable of collecting charging information related to GPRS network resources used by each mobile terminal.

303: The GGSN receives the IP packet forwarded by the mobile terminal.

304: The GGSN acquires the TTL value in the IP packet, and determines whether the acquired TTL value is different from a specified TTL value, and if yes, executes 305; otherwise, the flow ends.

The specified TTL value is a fixed TTL value of an operating system. Referring to Table 1, the specified TTL value in this embodiment may be, but is not limited to, 128, 64, or 69, and may be sent to the mobile terminal by the to-be-networked device, and the mobile terminal informs the GGSN of the specified TTL value. Moreover, the GGSN further acquires the TTL value in the received IP packet and determines whether the acquired TTL value is different from the specified TTL value. The determining whether the acquired TTL value is different from a specified TTL value may specifically be: determining, by the GGSN, whether the TTL value in the IP packet is 1 less than the specified TTL value. If the TTL value is 1 less than the specified TTL value, it is determined that the IP packet is sent by the to-be-networked device and forwarded by the mobile terminal, thereby determining that the to-be-networked device performs a network tethering behavior; and if the TTL value is equal to the specified TTL value, it is determined that the IP packet is generated and sent by the mobile terminal and the mobile terminal performs an autonomous network access behavior, thereby determining that the to-be-networked device does not perform a network tethering behavior.

It is still assumed that the Windows Phone is connected to the Apple iOS and implements the network tethering behavior through the Apple iOS. If the Apple iOS forwards the IP packet of the Windows Phone, the TTL value in the IP packet acquired by the GGSN is 127. Because the specified TTL value is 128, 64 or 69, which is different from 127, the GGSN determines that the Windows Phone performs the network tethering behavior. If the Apple iOS generates and sends the IP packet, the TTL value in the IP packet acquired by the GGSN is 64. Because the specified TTL values include 64, the GGSN determines that the Windows Phone does not perform the network tethering behavior and that the Apple iOS performs an autonomous network access behavior.

305: The GGSN determines that the to-be-networked device performs a network tethering behavior and processes the IP packet according to a preset policy and rule.

In this embodiment, the GGSN reads the preset policy and rule to process the IP packet. The policy and rule are preset locally by the GGSN. Specifically, the GGSN sets different policies and rules for services provided by an operator. When the GGSN determines that the to-be-networked device performs the network tethering behavior, the GGSN acquires a service that a subscriber subscribes, to acquire a policy and a rule corresponding to the service, and processes the IP packet according to the policy and rule.

The processing, by the GGSN, the IP packet may include, but is not limited to, discarding the IP packet, or blocking the IP packet, or performing charging for the IP packet according to a charging rule of the GGSN.

In the foregoing method provided in this embodiment, an IP packet sent by a to-be-networked device and forwarded by a mobile terminal is received, a TTL value in the IP packet is acquired, and if it is determined that the acquired TTL value is different from a specified TTL value, it is determined that the mobile terminal modifies the TTL value and it is further determined that the IP packet is forwarded by the mobile terminal, thereby determining that the to-be-networked device performs a network tethering behavior. A TTL value exists in each IP packet, so a method for identifying a network tethering behavior according to the modified TTL value avoids a problem in the prior art that a network tethering behavior cannot be determined when no UA field exists in a Get packet, and improves accuracy of identifying a network tethering behavior. Moreover, an operating system corresponds to a fixed TTL value, so the method for identifying a network tethering behavior according to the modified TTL value is applicable to any operating system, thereby expanding a range of applicable scenarios for identifying a network tethering behavior.

Embodiment 4

Figure 4A:
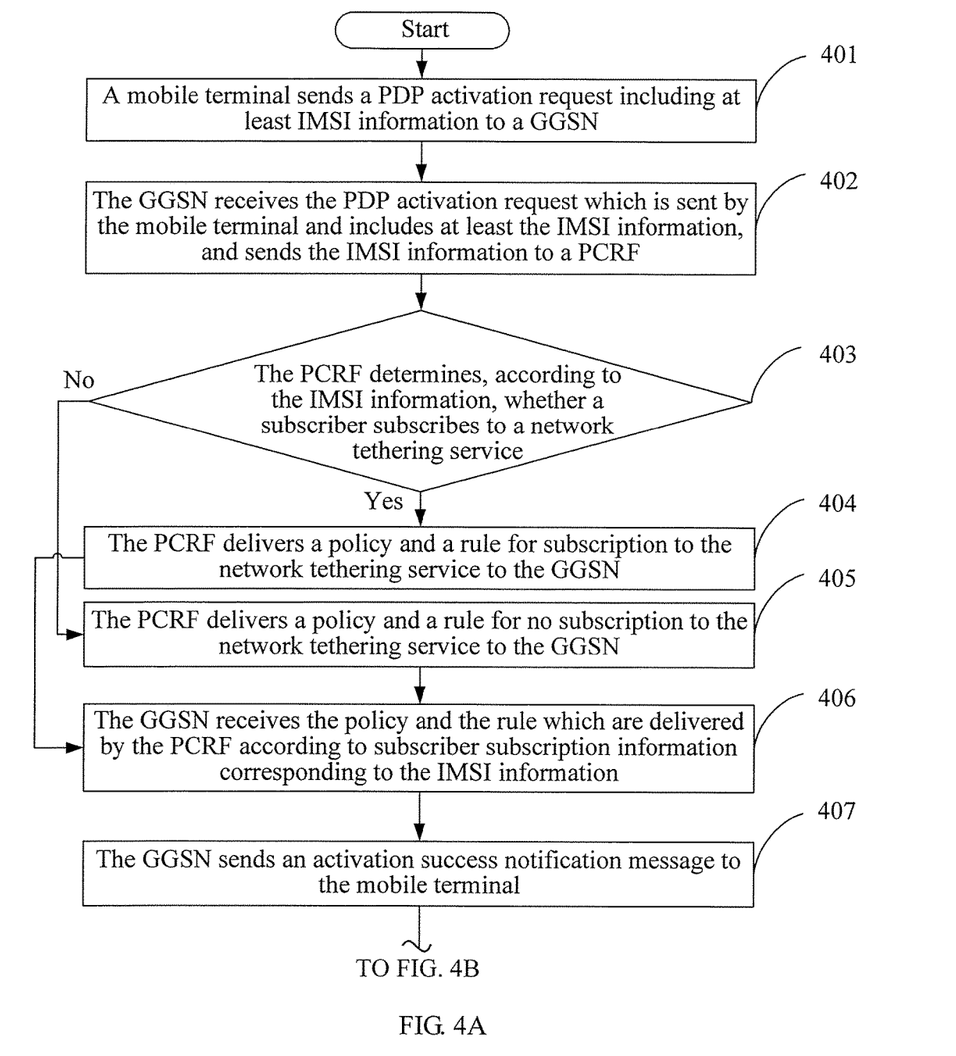
FIG. 4A and FIG. 4B are a flow charts of a method for identifying a network tethering behavior according to Embodiment 4 of the present invention.
Figure 4B:
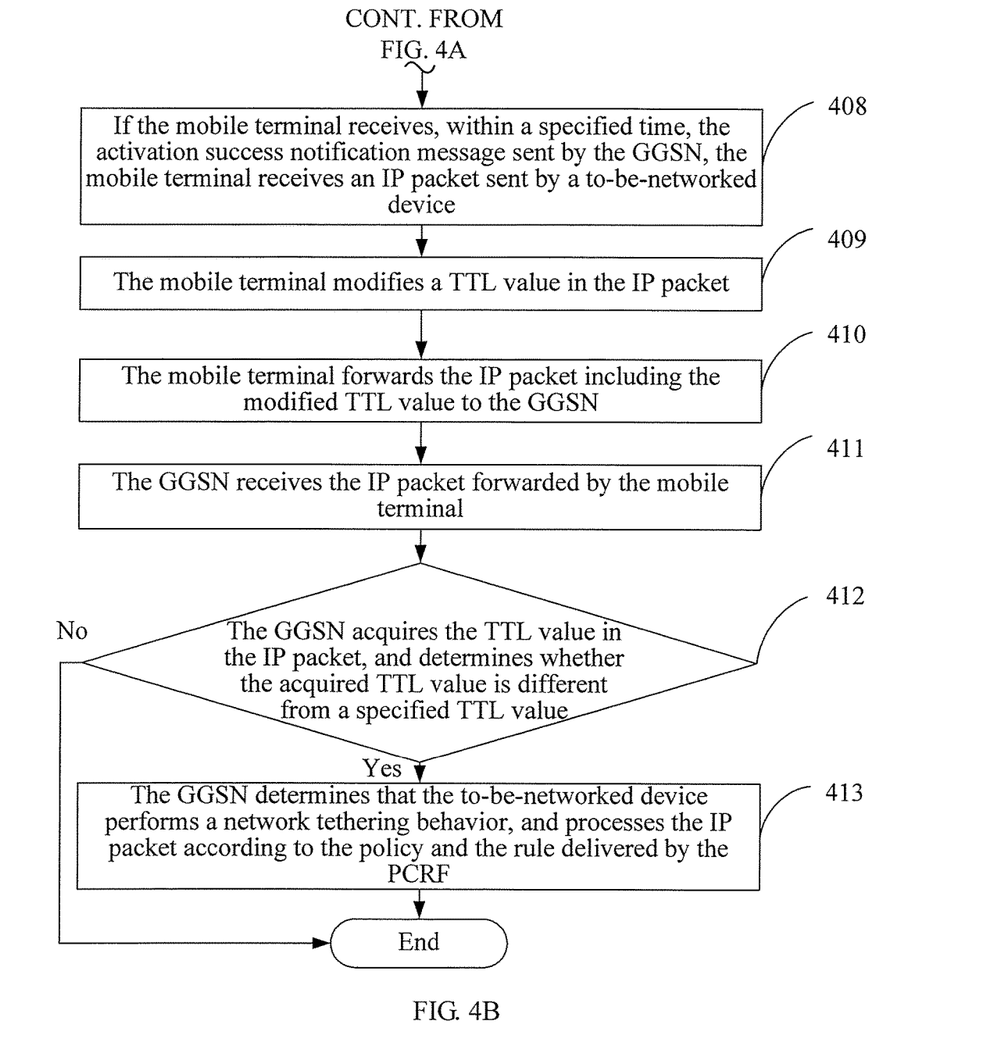

Referring to FIG. 4A and FIG. 4B, this embodiment provides a method for identifying a network tethering behavior, where an IP packet is processed according to a policy and a rule delivered by a PCRF. The flow of the method is specifically as follows:

401: A mobile terminal sends a PDP activation request including at least IMSI information to a GGSN.

In this embodiment, an IMSI is an international mobile subscriber identity and can uniquely identify a mobile subscriber. After being attached to a GPRS network through the IMSI information, the mobile terminal sends the PDP activation request including at least the IMSI information to the GGSN, so as to establish a data channel between the mobile terminal and the GPRS network through the PDP activation procedure. The PDP is a packet data protocol and is a network protocol used by an external PDN (Public Data Network, public data network) and a GPRS interface.

402: The GGSN receives the PDP activation request which is sent by the mobile terminal and includes at least the IMSI information, and sends the IMSI information to a PCRF.

In this embodiment, the GGSN does not have a charging function, so the PCRF needs to be deployed in the network, so as to perform charging for GPRS network resources used by the mobile terminal. The PCRF is used to formulate, according to service information, a policy and a rule, which may include, but is not limited to, data flow detection, threshold control, QoS (Quality of Service, quality of service) control, and flow-based charging. Generally, one network may include a plurality of PCRFs, where each PCRF can formulate a corresponding policy and a rule, and control, according to the policy and the rule, a mobile terminal managed by the PCRF.

403: The PCRF determines, according to the IMSI information, whether a subscriber subscribes a network tethering service; if yes, executes 404; otherwise, executes 405.

In this embodiment, subscription information of subscriber refers to information about a service subscribed to by a subscriber with an operator, where the service may include, but is not limited to, a GPRS mobile data service, a network tethering service, and a short message service. The subscription information of subscriber may be uniquely identified by the IMSI information, so the PCRF can acquire the corresponding subscription information of subscriber according to the IMSI information, and determine, according to the subscription information of subscriber, whether the subscriber subscribes the network tethering service.

404: The PCRF delivers a policy and a rule for subscription to the network tethering service to the GGSN, and 406 is executed.

In this embodiment, the policy and the rule for subscription to the network tethering service are a policy and a rule designated by the operator for a subscriber already subscribing to the network tethering service. For example, the operator sets a network tethering service where 5 Yuan is paid for 30 Mbit GPRS traffic and 1 Yuan is charged for every 1 Mbit excessive GPRS traffic, or sets a network tethering service where 20 Yuan is paid for 150 Mbit GPRS traffic and 2 Yuan is charged for every 1 Mbit excessive GPRS traffic, which is not limited in this embodiment.

405: The PCRF delivers a policy and a rule for no subscription to the network tethering service to the GGSN.

In this embodiment, the policy and the rule for no subscription to the network tethering service are a policy and a rule designated by the operator for a subscriber not subscribing to the network tethering service. For example, the operator sets that 1 Yuan is charged for every 1 Mbit GPRS traffic, or 2 Yuan is charged for every 1 Mbit GPRS traffic, which is not limited in this embodiment.

406: The GGSN receives the policy and the rule which are delivered by the PCRF according to subscription information of subscriber corresponding to the IMSI information.

In this embodiment, the GGSN stores the received policy and rule, so as to control the network tethering behavior according to the policy and rule.

407: The GGSN sends an activation success notification message to the mobile terminal.

408: If the mobile terminal receives, within a specified time, the activation success notification message sent by the GGSN, the mobile terminal receives an IP packet sent by a to-be-networked device.

In this embodiment, if the mobile terminal receives, within the specified time, the activation success notification message sent by the GGSN, it indicates that a data channel between the mobile terminal and the GPRS network is completely established, and the mobile terminal can enable a network tethering function, to receive the IP packet sent by the to-be-networked device; and if the mobile terminal does not receive, within the specified time, the activation success notification message sent by the GGSN, it indicates that a PDP activation procedure between the mobile terminal and the GPRS network fails, and in this case, the mobile terminal cannot be connected to the GPRS network, that is, the mobile terminal cannot enable a network tethering function.

409: The mobile terminal modifies a TTL value in the IP packet.

Specifically, after receiving the IP packet sent by the to-be-networked device, the mobile terminal acquires the TTL value in the IP packet and modifies the acquired TTL value to indicate that the IP packet is sent by the to-be-networked device, so as to distinguish the IP packet from an IP packet sent by the mobile terminal to the GPRS network.

Further, the modifying a TTL value in the IP packet may specifically be: subtracting, by the mobile terminal, 1 from the TTL value in the IP packet.

410: The mobile terminal forwards the IP packet including the modified TTL value to the GGSN.

411: The GGSN receives the IP packet forwarded by the mobile terminal.

412: The GGSN acquires the TTL value in the IP packet, and determines whether the acquired TTL value is different from a specified TTL value, and if yes, executes 413; otherwise, the flow ends.

Specifically, for the determining whether the acquired TTL value is different from a specified TTL value, reference may be made to the description in step 304, and the details are not described here again.

413: The GGSN determines that the to-be-networked device performs a network tethering behavior and processes the IP packet according to the policy and rule delivered by the PCRF.

In this embodiment, the GGSN reads the policy and rule delivered by the PCRF, to process the IP packet. The policy and rule are preset by the PCRF. Specifically, the PCRF sets different policies and rules for services provided by the operator, and delivers the policies and rules to the GGSN, and the GGSN processes the IP packet.

Specifically, the processing, by the GGSN, the IP packet may include, but is not limited to, discarding the IP packet, or blocking the IP packet, or performing charging for the IP packet according to a charging rule delivered by the PCRF.

Optionally, the method may further include: if the GGSN already receives a notification message delivered by the PCRF, and the notification message carries an event trigger parameter for instructing the GGSN to report the network tethering behavior, reporting the network tethering behavior to the PCRF, so that the PCRF notifies the mobile terminal that the to-be-networked device is using the network tethering service.

In this embodiment, the notification message is used to instruct the GGSN to report the network tethering behavior, and may be a CCA-I (Credit Control Answer-Initial, credit control answer-initial), or may also be another notification message, which is not limited in this embodiment.

The event trigger parameter is used to instruct the GGSN to report the network tethering behavior, which specifically indicates that, when the GGSN detects that an event of the network tethering behavior occurs, the GGSN is triggered to report the event to the PCRF.

Specifically, the PCRF can extend a value of Event-Trigger (an event trigger parameter) on a Gx interface, and adds Tethering_REPORT as a value of Event-Trigger to instruct the GGSN to report the network tethering behavior, which is specifically as follows:
<Event-Trigger>::=<AVP Header: AVP Code 1006, M-Bit set, V-Bit set, Vendor-ID 10415>
Event-Trigger=Tethering_REPORT (101)

The reporting the network tethering behavior to the PCRF may include:
sending, by the GGSN, a status parameter added on the Gx interface to the PCRF, where the status parameter is used to mark a status of the network tethering behavior.

Specifically, the status parameter added on the Gx interface may be X-HW-Event-Status (an event status), where a structure of X-HW-Event-Status is as follows:
<X-HW-Event-Status>::=<AVP Header: AVP Code 2018, V-Bit set, Vendor-ID 2011>
  [START]
  [STOP]
  *[AVP]

The GGSN sends X-HW-Event-Status to the PCRF to mark the status of the network tethering behavior. For example, when the GGSN assigns [START] to X-HW-Event-Status and sends X-HW-Event-Status to the PCRF, the PCRF finds, through reading, that a value of X-HW-Event-Status is [START], and determines that the network tethering behavior starts; when the GGSN assigns [STOP] to X-HW-Event-Status and sends X-HW-Event-Status to the PCRF, the PCRF finds, through reading, that a value of X-HW-Event-Status is [STOP], and determines that the network tethering behavior ends. Definitely, another status parameter may also be added in X-HW-Event-Status to mark the status of the network tethering behavior, which is not limited in this embodiment.

Preferably, after receiving X-HW-Event-Status sent by the GGSN, the PCRF may notify, through a mail or a short message, the mobile terminal that the to-be-networked device is currently using the network tethering service. Definitely, the PCRF may also notify, in another manner, the mobile terminal that the to-be-networked device is currently using the network tethering service, which is not limited in this embodiment.

Figure 5:
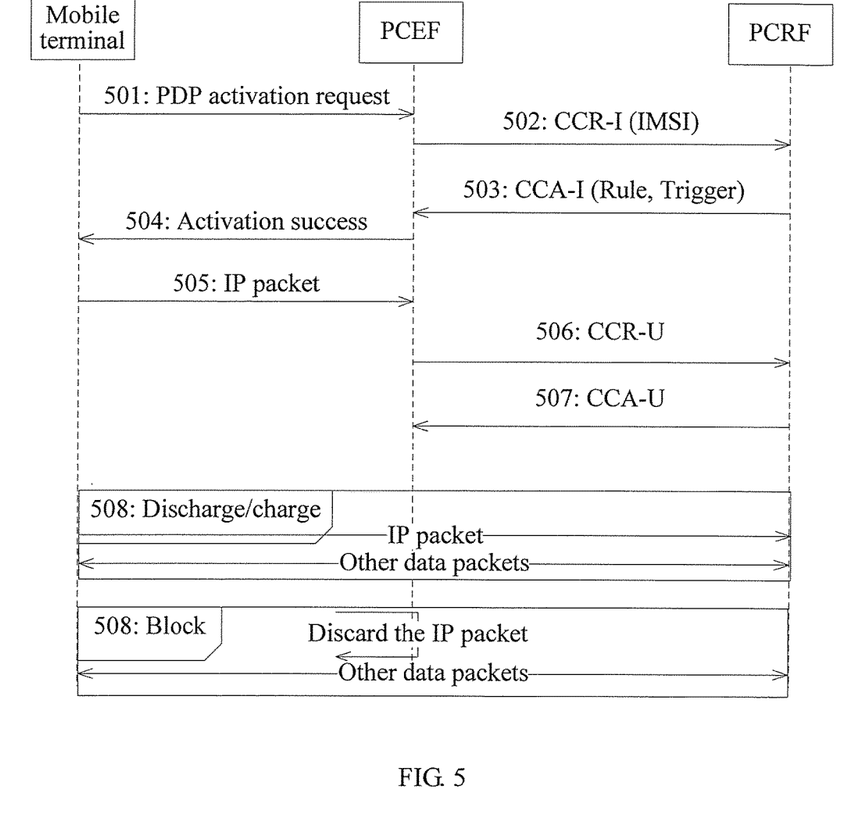
FIG. 5 is a schematic diagram of an application flow of a method for identifying a network tethering behavior according to Embodiment 4 of the present invention.

Referring to FIG. 5, FIG. 5 is a schematic flow chart of a specific application of the method according to this embodiment. The specific process of identifying a network tethering behavior is as follows:

501: A mobile terminal sends a PDP activation request to a PCEF (Policy and Charging Enforcement Function, policy and charging enforcement function).

The PCEF mainly includes functions of service data flow detection, policy enforcement, and flow-based charging and is located in a GGSN.

502: The PCEF reports IMSI information to a PCRF through a CCR-I (Credit Control Request-Initial, credit control request-initial) message.

503: The PCRF delivers a policy and a rule to the PCEF through a CCA-I message.

If the PCRF delivers a policy and a rule for no subscription to a network tethering behavior, and the PCRF needs to notify the mobile terminal that a to-be-networked device is currently using a network tethering service, the PCRF further delivers a notification message to the GGSN through the CCA-I message.

504: The PCEF sends an activation success notification message to the mobile terminal.

505: The PCEF receives an IP packet sent by the mobile terminal.

506: The PCEF reports a network tethering behavior to the PCRF through a CCR-U (Credit Control Request-Update, credit control request-update) message.

507: The PCRF reports a response message to the PCEF through a CCA-U (Credit Control Answer-Update, credit control answer-update) message.

508: The PCEF processes the IP packet according to the policy and the rule delivered by the PCRF.

In the method provided in this embodiment, an IP packet sent by a to-be-networked device and forwarded by a mobile terminal is received, a TTL value in the IP packet is acquired, and if it is determined that the acquired TTL value is different from a specified TTL value, it is determined that the mobile terminal modifies the TTL value and it is further determined that the IP packet is forwarded by the mobile terminal, thereby determining that the to-be-networked device performs a network tethering behavior. A TTL value exists in each IP packet, so a method for identifying a network tethering behavior according to the modified TTL value avoids a problem in the prior art that a network tethering behavior cannot be determined when no UA field exists in a Get packet, and improves accuracy of identifying a network tethering behavior. Moreover, an operating system corresponds to a fixed TTL value, so the method for identifying a network tethering behavior according to the modified TTL value is applicable to any operating system, thereby expanding a range of applicable scenarios for identifying a network tethering behavior.

Moreover, if it is determined that a notification message delivered by the PCRF is received, and the notification message carries an event trigger parameter for instructing the GGSN to report the network tethering behavior, the network tethering behavior is reported to the PCRF, so that the PCRF can notify the mobile terminal that the to-be-networked device is using a network tethering service, and a subscriber of the mobile terminal can control the network tethering behavior, thereby reducing the use of the network tethering service caused by misoperation, and making the identification of the network tethering behavior more humanized.

Embodiment 5

Figure 6:
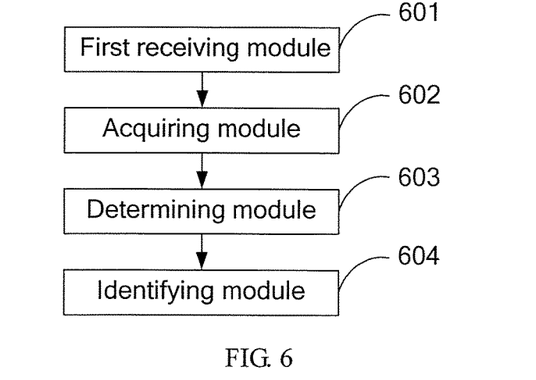
FIG. 6 is a schematic structural diagram of a gateway general packet radio service support node according to Embodiment 5 of the present invention.

Referring to FIG. 6, this embodiment provides a gateway general packet radio service support node GGSN, where the GGSN may include:
a first receiving module 601, configured to receive an IP packet sent by a to-be-networked device and forwarded by a mobile terminal; an acquiring module 602, configured to acquire a TTL value in the IP packet;
a determining module 603, configured to determine whether the acquired TTL value is different from a specified TTL value; and
an identifying module 604, configured to, if the determining module 603 determines that the acquired TTL value is different from the specified TTL value, determine that the to-be-networked device performs a network tethering behavior.

Specifically, if the determining module 603 determines that the TTL value is 1 less than the specified TTL value, the identifying module 604 determines that the IP packet is sent by the to-be-networked device and forwarded by the mobile terminal, thereby determining that the to-be-networked device performs a network tethering behavior; and if the determining module 603 determines that the TTL value is equal to the specified TTL value, the identifying module 604 determines that the IP packet is generated and sent by the mobile terminal and the mobile terminal performs an autonomous network access behavior, thereby determining that the to-be-networked device does not perform a network tethering behavior.

The GGSN provided in this embodiment can execute the method for identifying a network tethering behavior according to any one of the foregoing method embodiments. For the detailed process, reference may be made to description in the method embodiments, and details are not described here again.

The GGSN provided in this embodiment receives an IP packet sent by a to-be-networked device and forwarded by a mobile terminal, acquires a TTL value in the IP packet, determines whether the acquired TTL value is different from a specified TTL value, and if yes, determines that the mobile terminal modifies the TTL value and further determines that the IP packet is forwarded by the mobile terminal, thereby determining that the to-be-networked device performs a network tethering behavior. A TTL value exists in each IP packet, so a method for identifying a network tethering behavior according to the modified TTL value avoids a problem in the prior art that a network tethering behavior cannot be determined when no UA field exists in a Get packet, and improves accuracy of identifying a network tethering behavior. Moreover, an operating system corresponds to a fixed TTL value, so the method for identifying a network tethering behavior according to the modified TTL value is applicable to any operating system, thereby expanding a range of applicable scenarios for identifying a network tethering behavior.

Embodiment 6

Figure 7:
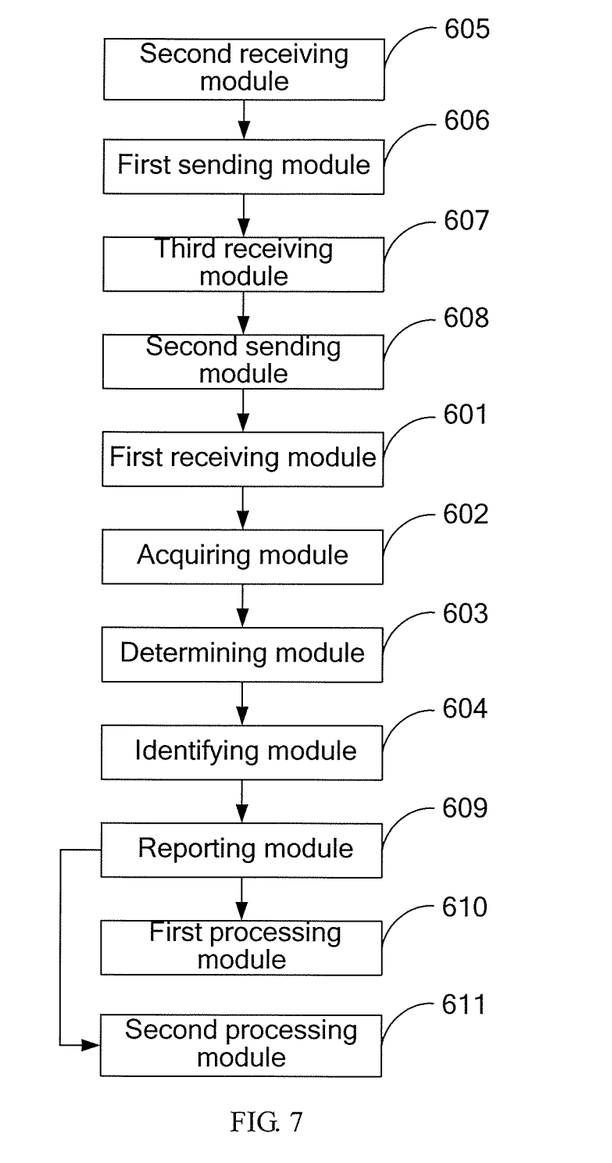
FIG. 7 is a schematic structural diagram of a gateway general packet radio service support node according to Embodiment 6 of the present invention.

Referring to FIG. 7, this embodiment provides a gateway general packet radio service support node GGSN, where a difference between the GGSN in this embodiment and the GGSN provided in Embodiment 5 is that:
in this embodiment, the determining module 603 is configured to determine whether the TTL value in the IP packet is 1 less than the specified TTL value.

In this embodiment, the GGSN may further include:
a second receiving module 605, configured to receive a PDP activation request which is sent by the mobile terminal and includes at least IMSI information;
a first sending module 606, configured to send the IMSI information to a PCRF;
a third receiving module 607, configured to receive a policy and a rule which are delivered by the PCRF according to subscription information of subscriber corresponding to the IMSI information; and a second sending module 608, configured to send an activation success notification message to the mobile terminal.

In this embodiment, the GGSN may further include:
a reporting module 609, configured to, if the GGSN already receives a notification message delivered by the PCRF, and the notification message carries an event trigger parameter for instructing the GGSN to report the network tethering behavior, report the network tethering behavior to the PCRF, so that the PCRF notifies the mobile terminal that the to-be-networked device is using a network tethering service.

In this embodiment, the reporting module 609 is configured to send a status parameter added on a Gx interface to the PCRF, where the status parameter is used to mark a status of the network tethering behavior.

In this embodiment, the GGSN may further include:
a first processing module 610, configured to process the IP packet according to a preset policy and rule; or
a second processing module 611, configured to process the IP packet according to a policy and a rule delivered by the PCRF.

The GGSN provided in this embodiment can execute the method for identifying a network tethering behavior according to any one of the foregoing method embodiments. For the detailed process, reference may be made to description in the method embodiments, and details are not described here again.

The GGSN provided in this embodiment receives an IP packet sent by a to-be-networked device and forwarded by a mobile terminal, acquires a TTL value in the IP packet, determines whether the acquired TTL value is different from a specified TTL value, and if yes, determines that the mobile terminal modifies the TTL value and further determines that the IP packet is forwarded by the mobile terminal, thereby determining that the to-be-networked device performs a network tethering behavior. A TTL value exists in each IP packet, so a method for identifying a network tethering behavior according to the modified TTL value avoids a problem in the prior art that a network tethering behavior cannot be determined when no UA field exists in a Get packet, and improves accuracy of identifying a network tethering behavior. Moreover, an operating system corresponds to a fixed TTL value, so the method for identifying a network tethering behavior according to the modified TTL value is applicable to any operating system, thereby expanding a range of applicable scenarios for identifying a network tethering behavior.

Moreover, if it is determined that a notification message delivered by the PCRF is received, and the notification message carries an event trigger parameter for instructing the GGSN to report the network tethering behavior, the network tethering behavior is reported to the PCRF, so that the PCRF can notify the mobile terminal that the to-be-networked device is using a network tethering service, and a subscriber of the mobile terminal can control the network tethering behavior, thereby reducing the use of the network tethering service caused by misoperation, and making the identification of the network tethering behavior more humanized.

Embodiment 7

Figure 8:
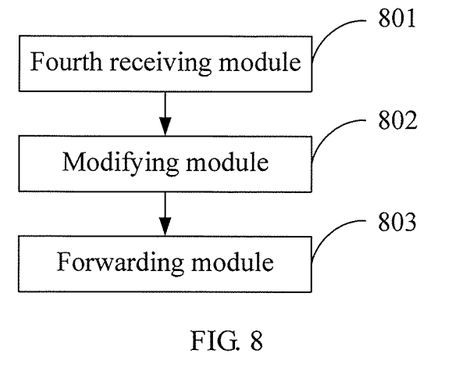
FIG. 8 is a schematic structural diagram of a mobile terminal according to Embodiment 7 of the present invention.

Referring to FIG. 8, this embodiment provides a mobile terminal, where the mobile terminal includes:
a fourth receiving module 801, configured to receive an IP packet sent by a to-be-networked device;
a modifying module 802, configured to modify a TTL value in the IP packet, where
after receiving the IP packet sent by the to-be-networked device, the mobile terminal acquires the TTL value in the IP packet, and modifies the acquired TTL value through the modifying module 802 to indicate that the IP packet is sent by the to-be-networked device, so as to distinguish the IP packet from an IP packet sent by the mobile terminal to a GPRS network; and a forwarding module 803, configured to forward the IP packet including the modified TTL value to a GGSN, so that the GGSN identifies a network tethering behavior of the to-be-networked device according to the modified TTL value.

The mobile terminal provided in this embodiment can execute the method for identifying a network tethering behavior according to any one of the foregoing method embodiments. For the detailed process, reference may be made to description in the method embodiments, and details are not described here again.

The mobile terminal provided in this embodiment receives an IP packet sent by a to-be-networked device, modifies a TTL value in the IP packet, and forwards the IP packet including the modified TTL value to the GGSN, so that the GGSN can determine, according to the modified TTL value, that the IP packet is forwarded by the mobile terminal, thereby identifying a network tethering behavior of the to-be-networked device. A TTL value exists in each IP packet, so a method for identifying a network tethering behavior according to the modified TTL value avoids a problem in the prior art that a network tethering behavior cannot be determined when no UA field exists in a Get packet, and improves accuracy of identifying a network tethering behavior. Moreover, an operating system corresponds to a fixed TTL value, so the method for identifying a network tethering behavior according to the modified TTL value is applicable to any operating system, thereby expanding a range of applicable scenarios for identifying a network tethering behavior.

Embodiment 8

Figure 9:
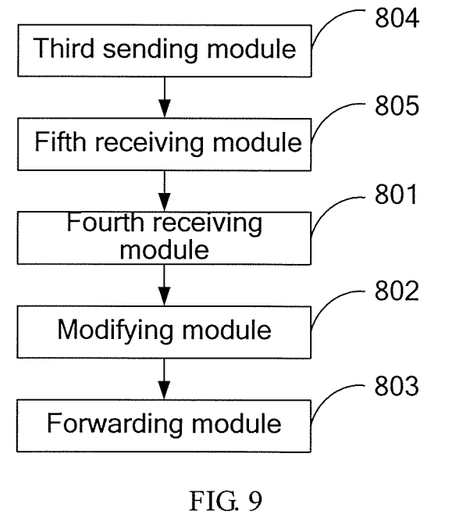
FIG. 9 is a schematic structural diagram of a mobile terminal according to Embodiment 8 of the present invention.

Referring to FIG. 9, this embodiment provides a mobile terminal, where a difference between the mobile terminal in this embodiment and the mobile terminal provided in Embodiment 7 is that: in this embodiment, the modifying module 802 is configured to subtract 1 from the TTL value in the IP packet.

In this embodiment, the mobile terminal may further include:

a third sending module 804, configured to send a PDP activation request including at least IMSI information to a GGSN, so that the GGSN sends the IMSI information to a PCRF; and a fifth receiving module 805, configured to, after the GGSN receives a policy and a rule which are delivered by the PCRF according to subscription information corresponding to the IMSI information, receive an activation success notification message sent by the GGSN.

The mobile terminal provided in this embodiment can execute the method for identifying a network tethering behavior according to any one of the foregoing method embodiments. For the detailed process, reference may be made to description in the method embodiments, and details are not described here again.

The mobile terminal provided in this embodiment receives an IP packet sent by a to-be-networked device, modifies a TTL value in the IP packet, and forwards the IP packet including the modified TTL value to the GGSN, so that the GGSN can determine, according to the modified TTL value, that the IP packet is forwarded by the mobile terminal, thereby identifying a network tethering behavior of the to-be-networked device. A TTL value exists in each IP packet, so a method for identifying a network tethering behavior according to the modified TTL value avoids a problem in the prior art that a network tethering behavior cannot be determined when no UA field exists in a Get packet, and improves accuracy of identifying a network tethering behavior. Moreover, an operating system corresponds to a fixed TTL value, so the method for identifying a network tethering behavior according to the modified TTL value is applicable to any operating system, thereby expanding a range of applicable scenarios for identifying a network tethering behavior.

Embodiment 9

Figure 10:
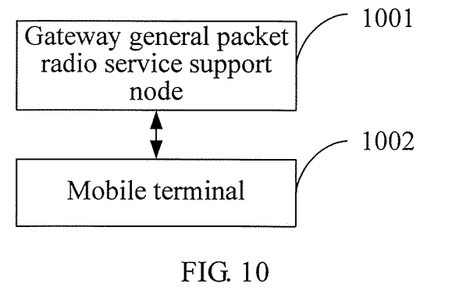
FIG. 10 is a schematic structural diagram of a system for identifying a network tethering behavior according to Embodiment 9 of the present invention.

Referring to FIG. 10, this embodiment provides a system for identifying a network tethering behavior, where the system may include a gateway general packet radio service support node GGSN 1001 and a mobile terminal 1002.

The GGSN 1001 may be the GGSN according to Embodiment 5 or Embodiment 6, and the mobile terminal 1002 may be the mobile terminal according to Embodiment 7 or Embodiment 8.

The system for identifying a network tethering behavior provided in this embodiment can execute the method for identifying a network tethering behavior according to any one of the foregoing method embodiments. For the detailed process, reference may be made to description in the method embodiments, and details are not described here again.

The system for identifying a network tethering behavior provided in this embodiment receives an IP packet sent by a to-be-networked device and forwarded by a mobile terminal, acquires a TTL value in the IP packet, determines whether the acquired TTL value is different from a specified TTL value, and if yes, determines that the mobile terminal modifies the TTL value and further determines that the IP packet is forwarded by the mobile terminal, thereby determining that the to-be-networked device performs a network tethering behavior. A TTL value exists in each IP packet, so a method for identifying a network tethering behavior according to the modified TTL value avoids a problem in the prior art that a network tethering behavior cannot be determined when no UA field exists in a Get packet, and improves accuracy of identifying a network tethering behavior. Moreover, an operating system corresponds to a fixed TTL value, so the method for identifying a network tethering behavior according to the modified TTL value is applicable to any operating system, thereby expanding a range of applicable scenarios for identifying a network tethering behavior.

Moreover, if it is determined that a notification message delivered by the PCRF is received, and the notification message carries an event trigger parameter for instructing the GGSN to report the network tethering behavior, the network tethering behavior is reported to the PCRF, so that the PCRF can notify the mobile terminal that the to-be-networked device is using a network tethering service, and a subscriber of the mobile terminal can control the network tethering behavior, thereby reducing the use of the network tethering service caused by misoperation, and making the identification of the network tethering behavior more humanized.

It should be noted that, when the system for identifying a network tethering behavior provided in the embodiment identifies a network tethering behavior, division of the foregoing functional modules is only used as an example for illustration. In an actual application, the foregoing functions may be allocated to and be completed by different functional modules according to requirements, that is, an internal structure of the apparatus is divided into different functional modules, so as to complete all or a part of functions described in the foregoing. Moreover, the gateway general packet radio service support node, the mobile terminal, the system for identifying a network tethering behavior, and the method for identifying a network tethering behavior according to the foregoing embodiments belong to the same idea. For a detailed implementation process, reference may be made to the method embodiments, and details are not described here again.

The sequence numbers of the foregoing embodiments of the present invention are merely for the convenience of description, and do not imply the preference among the embodiments.

Through the description of the foregoing implementation manners, persons skilled in the art can clearly understand that, the present invention can be implemented through hardware, software, firmware, or a combination thereof. When implemented through software, the functions may be stored in a computer-readable medium or transmitted as one or more instructions or codes in the computer-readable medium. The computer-readable medium includes both a computer storage medium and a communication medium. The communication medium includes any medium that facilitates transfer of a computer program from one place to another. The storage medium may be any available medium that can be accessed by a computer. Such computer-readable medium may include, by way of example and not by way of limitation, a RAM, a ROM, an EEPROM, a CD-ROM or other optical disk storage or magnetic disk storage media, or other magnetic storage devices, or any other media that can be used to carry or store desired program code in the form of instructions or data structures and can be accessed by a computer. Moreover, any connection may be properly termed a computer-readable medium. For example, if the software is transmitted from a website, a server, or another remote source by using a coaxial cable, optical fiber, optical cable, twisted pair, digital subscriber line (DSL), or wireless technologies such as infrared, radio, and microwave, the coaxial cable, optical fiber, optical cable, twisted pair, DSL, or wireless technologies such as infrared, radio, and microwave are included in the definition of the medium. A disk (Disk) and a disc (disc), as used in the present invention, include a compact disc (CD), a laser disc, an optical disc, a digital versatile disc (DVD), a floppy disk and a blu-ray disc, where disks usually reproduce data magnetically, while discs reproduce data optically with lasers. Combinations thereof shall also be included within the protection scope of the computer-readable medium. The above descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A method for identifying a network tethering behavior, the method comprising:
   receiving, by a gateway general packet radio service support node (GGSN), an Internet protocol (IP) packet sent by a to-be-networked device and forwarded by a mobile terminal;
   acquiring a time to live (TTL) value in the IP packet;
   determining whether the acquired TTL value is different from a specified TTL value; and
   if yes, determining that the to-be-networked device performs a network tethering behavior; and
   if the GGSN already receives a notification message delivered by a policy and charging rules function (PCRF), and the notification message carries an event trigger parameter for instructing the GGSN to report the network tethering behavior, reporting the network tethering behavior to the PCRF for notifying the mobile terminal that the to-be-networked device is using a network tethering service.

2. The method according to claim 1, wherein determining whether the acquired TTL value is different from the specified TTL value comprises:
   determining, by the GGSN, whether the TTL value in the IP packet is 1 less than the specified TTL value.

3. The method according to claim 1, wherein before receiving, by the GGSN, the IP packet sent by the to-be-networked device and forwarded by the mobile terminal, the method further comprises:
   receiving, by the GGSN, a packet data protocol (PDP) activation request which is sent by the mobile terminal and comprises at least international mobile subscriber identity (IMSI) information;
   sending the IMSI information to the PCRF;
   receiving a policy and a rule which are delivered by the PCRF according to subscription information of subscriber corresponding to the IMSI information; and
   sending an activation success notification message to the mobile terminal.

4. The method according to claim 3, wherein before receiving the policy and a rule which are delivered by the PCRF according to the subscription information of subscriber corresponding to the IMSI information, the method further comprises:
   determining, by the PCRF, according to the IMSI information, whether a subscriber subscribes a network tethering service;
   if yes, delivering a policy and a rule for subscription to the network tethering service to the GGSN; and
   if not, delivering a policy and a rule for no subscription to the network tethering service to the GGSN.

5. The method according to claim 1, wherein the reporting the network tethering behavior to the PCRF comprises:
   sending, by the GGSN, a status parameter added on a Gx interface to the PCRF, wherein the status parameter is used to mark a status of the network tethering behavior.

6. The method according to claim 1, wherein after determining that the to-be-networked device performs a network tethering behavior, the method further comprises:
   processing, by the GGSN, the IP packet according to a preset policy and rule.

7. The method according to claim 1, wherein after determining that the to-be-networked device performs a network tethering behavior, the method further comprises:
   processing, by the GGSN, the IP packet according to a policy and a rule delivered by the PCRF.

8. A gateway general packet radio service support node (GGSN), comprising:
   a memory; and
   a processor in communication with the memory, wherein the processor is configured to:
   receive an Internet protocol (IP) packet sent by a to-be-networked device and forwarded by a mobile terminal;
   acquire a time to live (TTL) value in the IP packet;
   determine whether the acquired TTL value is different from a specified TTL value;
   if the determining module determines that the acquired TTL value is different from the specified TTL value, determine that the to-be-networked device performs a network tethering behavior; and if the GGSN already receives a notification message delivered by a policy and charging rules function (PCRF), and the notification message carries an event trigger parameter for instructing the GGSN to report the network tethering behavior, report the network tethering behavior to the PCRF for notifying the mobile terminal that the to-be-networked device is using a network tethering service.

9. The GGSN according to claim 8, wherein the processor is further configured to determine whether the TTL value in the IP packet is 1 less than the specified TTL value.

10. The GGSN according to claim 8, wherein the processor is further configured to:

receive a packet data protocol (PDP) activation request which is sent by the mobile terminal and comprises at least international mobile subscriber identity (IMSI) information;

send the IMSI information to the PCRF;

receive a policy and a rule which are delivered by the PCRF according to subscription information of subscriber corresponding to the IMSI information; and send an activation success notification message to the mobile terminal.

11. The GGSN according to claim 8, wherein the processor is further configured to send a status parameter added on a Gx interface to the PCRF, wherein the status parameter is used to mark a status of the network tethering behavior.

12. The GGSN according to claim 8, wherein the GGSN is further configured to process the IP packet according to a preset policy and rule.

13. The GGSN according to claim 8, wherein the GGSN is further configured to process the IP packet according to a policy and a rule delivered by the (PCRF).

14. A system for identifying a network tethering behavior, comprising:

a gateway general packet radio service support node (GGSN), configured to:
receive an Internet protocol (IP) packet sent by a to-be-networked device and forwarded by a mobile terminal,
acquire a time to live (TTL) value in the IP packet;
determine whether the acquired TTL value is different from a specified TTL value, and
if the acquired TTL value is different from the specified TTL value, determine that the to-be-networked device performs a network tethering behavior; and a mobile terminal, configured to:
receive an Internet protocol (IP) packet sent by a to-be-networked device;
modify a time to live (TTL) value in the IP packet; and
forward the IP packet comprising the modified TTL value to the GGSN.

* * * * *